(No Model.) 4 Sheets—Sheet 1.

F. H. BOLTE.
PNEUMATIC TIRE.

No. 479,202. Patented July 19, 1892.

Witnesses
Geo. W. Young.
N. E. Oliphant

Inventor
Frank H. Bolte
By H. G. Underwood
Attorneys (No Model.) 4 Sheets—Sheet 2.
F. H. BOLTE.
PNEUMATIC TIRE.
No. 479,202. Patented July 19, 1892.
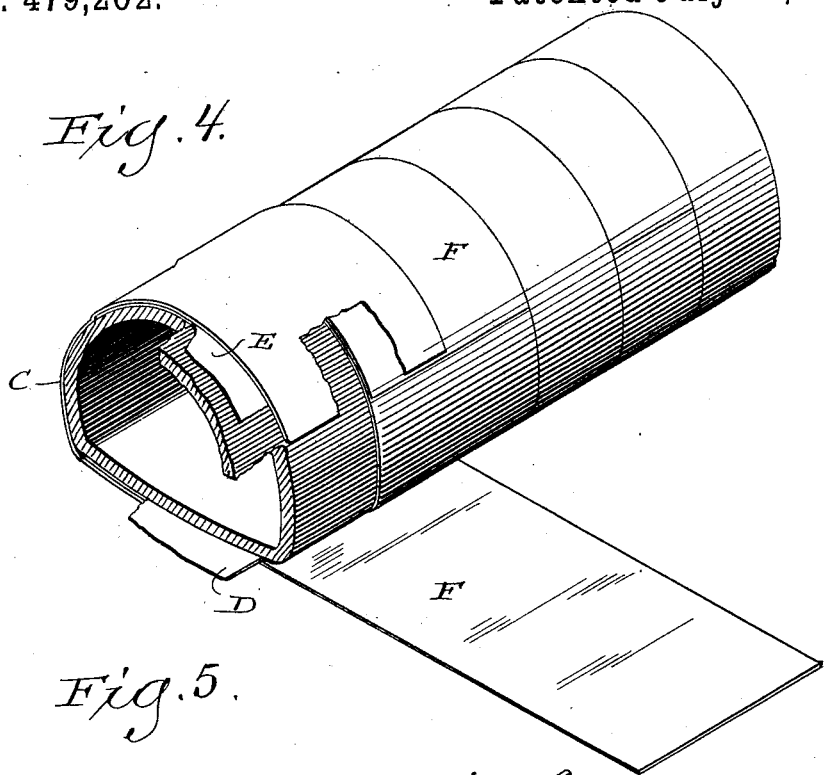
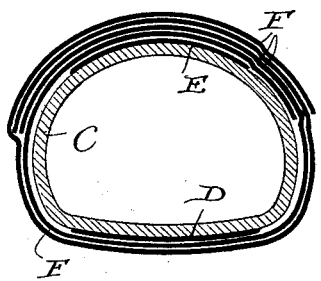
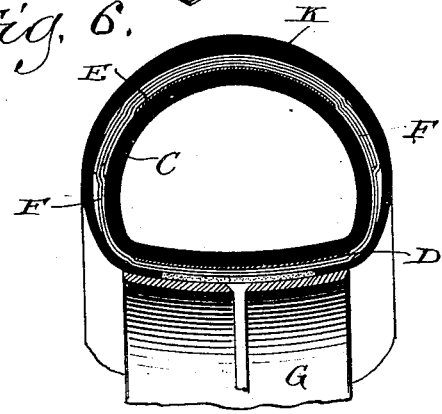
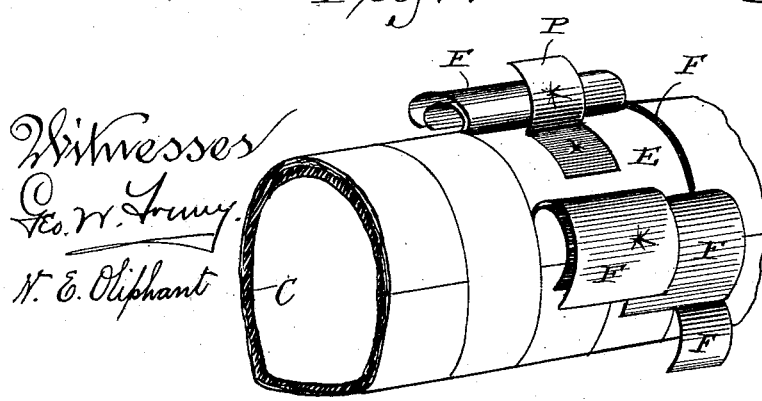
Witnesses
Geo. W. Tracy.
N. E. Oliphant.
Inventor
Frank H. Bolte
By H. G. Underwood
Attorney (No Model.)  
F. H. BOLTE.  
PNEUMATIC TIRE.

No. 479,202.  
Patented July 19, 1892.

Witnesses  
Geo. W. Horny.  
N. E. Oliphant

Inventor  
Frank H. Bolte  
By H. G. Underwood  
Attorney (No Model.)  4 Sheets—Sheet 4.

F. H. BOLTE.
PNEUMATIC TIRE.

No. 479,202.  Patented July 19, 1892.

Witnesses
Geo. W. Young
N. E. Oliphant

Inventor
Frank H. Bolte
By H. G. Underwood
Attorneys

THE NORRIS PETERS CO., PHOTO-LITHO., WASHINGTON, D. C.

UNITED STATES PATENT OFFICE.

FRANK. H. BOLTE, OF MILWAUKEE, WISCONSIN, ASSIGNOR OF ONE-HALF TO PARKER H. SERCOMBE, OF SAME PLACE.

PNEUMATIC TIRE.

SPECIFICATION forming part of Letters Patent No. 479,202, dated July 19, 1892.

Application filed August 21, 1891. Serial No. 403,292. (No model.)

*To all whom it may concern:*

Be it known that I, FRANK. H. BOLTE, a citizen of the United States, and a resident of Milwaukee, in the county of Milwaukee, and in the State of Wisconsin, have invented certain new and useful Improvements in Pneumatic Tires; and I do hereby declare that the following is a full, clear, and exact description thereof.

My invention has for its object to provide a pneumatic tire devoid of an inner expansible tube, as well as one that cannot be easily punctured, but which, if punctured, may be readily repaired; and to this end it consists in a certain method of manufacture and the peculiar construction and arrangement of parts to be hereinafter described with reference to the accompanying drawings and subsequently claimed.

Figure 1:
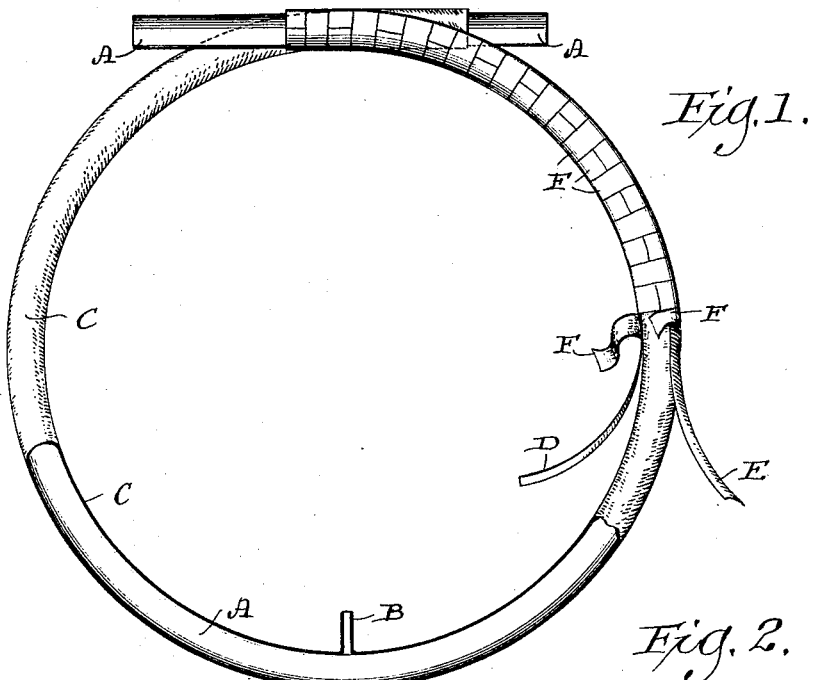
Figure 2:
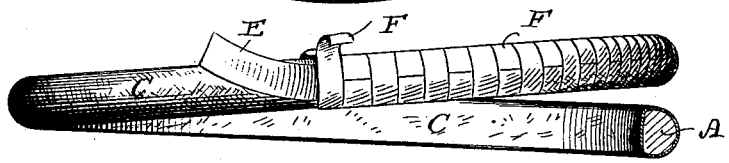
Figure 3:
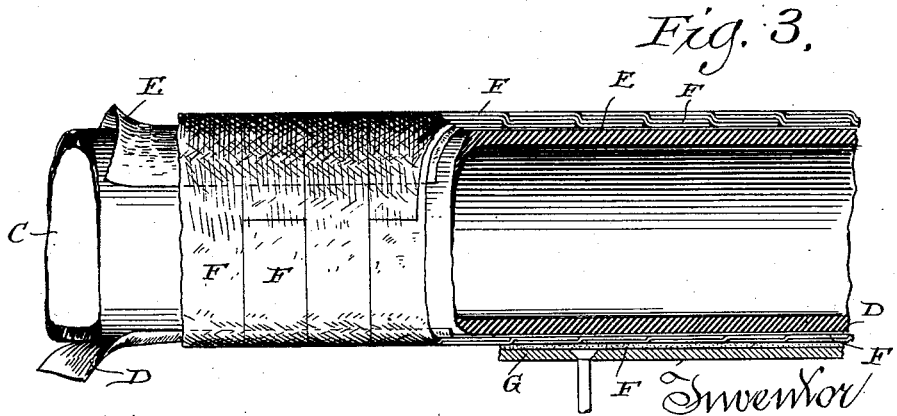
Figure 8:
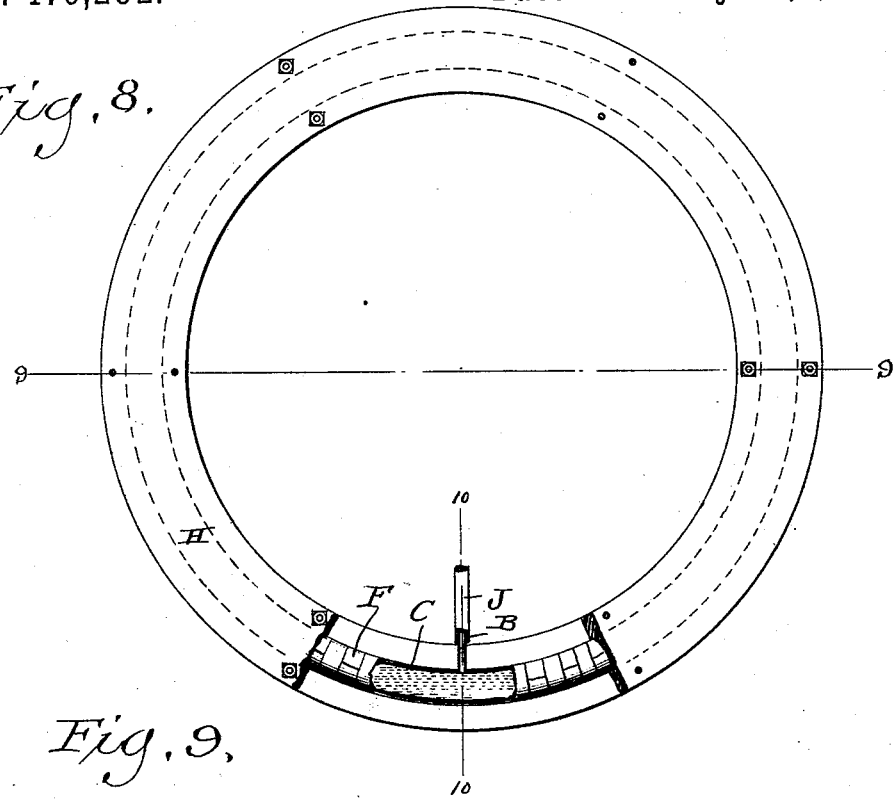
Figure 9:
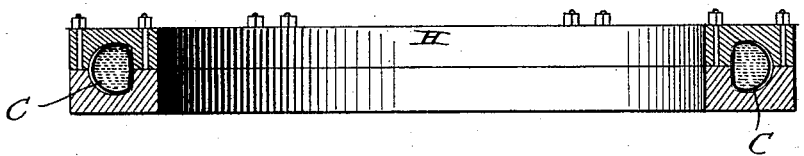
Figure 10:
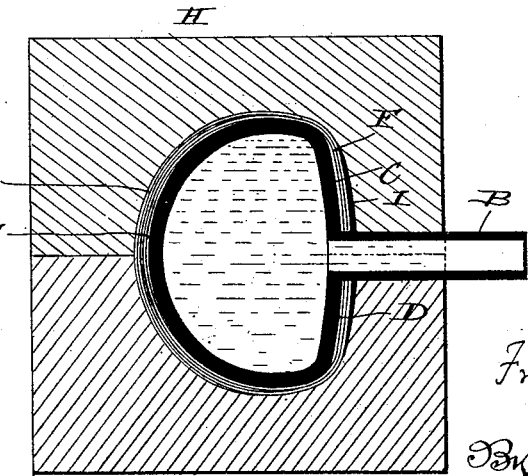
Figure 11:
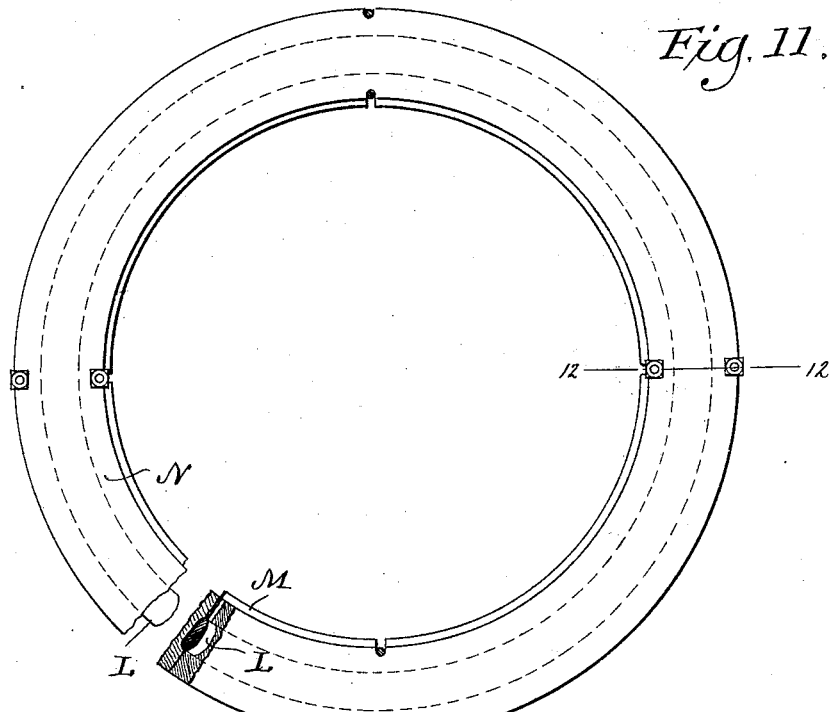
Figure 12:
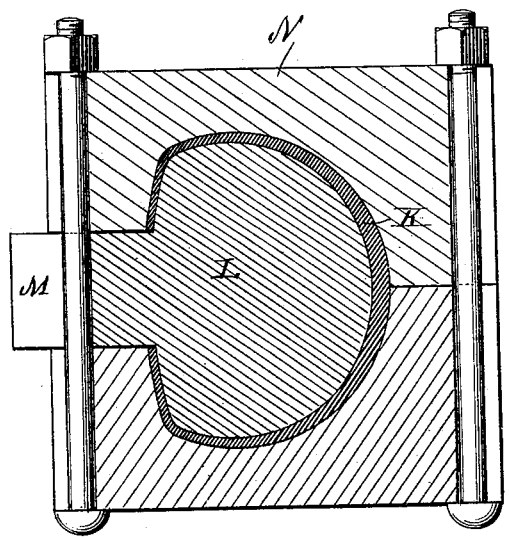

In the drawings, Figures 1 and 2 illustrate a mandrel and certain steps in the formation of the tube portion of a pneumatic tire in accordance with my invention; Fig. 3, an elevation of a portion of the completed tube, partly in section, and cemented to a wheel-rim; Fig. 4, a perspective view of a portion of the tube; Fig. 5, a transverse section of said tube; Fig. 6, a like view of the same in connection with a wheel-rim and an outer protective covering; Fig. 7, a perspective view illustrating how access may be had to the non-fibrous portion of the aforesaid tube for the purpose of repairing a puncture therein; Fig. 8, a plan view of a vulcanizing-mold, partly broken away, to show the tube therein; Figs. 9 and 10, sections, respectively, taken on lines 9 9 and 10 10 of the preceding figure; Fig. 11, a plan view of a mold for the outer protective covering of the tire-tube, and Fig. 12, a section taken on line 12 12 of the preceding figure.

Referring by letter to the drawings, A represents a mandrel, of iron, steel, or other suitable material, bent in the form of an open ring, having its ends preferably passing each other to extend horizontally in opposite directions, as shown in Fig. 1. In cross-section the mandrel is preferably of such form as to present an inner face that approximates to a straight line parallel to the axis, the remainder of said mandrel being in the form of an arc having the extremities thereof joined to said inner face, as best illustrated in Fig. 2. On the mandrel just described I shape a previously-formed tube C, of caoutchouc, provided with an inwardly-extending sleeve B, of like material, this sleeve being designed to receive a valve-nipple (not shown) common to all pneumatic tires for detachable connection with an air-pump, or other means for inflating such tires when completed and in place on wheels.

Before proceeding further it is to be understood that by the term "caoutchouc" I mean said material, either pure or compounded, and the same term is employed to designate the material before or after vulcanization. Consequently, said term is used in a general sense wherever it occurs unqualified in the description and claims. The tube C, having been shaped on the mandrel, I place thereon one or more circumferential strips of canvas or other fibrous material that have been previously stretched and coated with caoutchouc. As a matter of preference, I employ two of the circumferential strips, one of these D being placed on the outer circumference of the tube, and the other E on the inner circumference of said tube.

Particular attention is called to the fact that the strips D E just described serve as braces to prevent circumferential stretching of the tubular portion of my improved tire. The bracing-strips D E having been placed in position on the caoutchouc tube C, the latter and said strips are now wound with other strips F of canvas or other fibrous material, that have been previously stretched and treated with a coating of caoutchouc similar to that employed with said bracing-strips. The winding of the strips F is somewhat peculiar, and herein constitutes one of the steps in my method of manufacturing the tire-tube, the result being that with the circumferential bracing-strips D E above described I obtain five thicknesses of the fibrous material on the tread portion of the completed tube, three thicknesses of said material on that portion of the tube that directly opposes the rim G of a wheel, and two thicknesses of the aforesaid material intermediate of the tread and rim portions of said tube on opposite sides of the latter, as best illustrated by the exaggerated view, Fig. 5, these variable thicknesses of the fibrous wrapping on the aforesaid tube being proportionate to the liability of this tube to wear or puncture at certain portions thereof.

In wrapping the caoutchouc tube B with the strips F the first one of the latter is started a certain distance to one side of the center of the tread—say, on the right side, as seen in Fig. 5—and then laid entirely around said tube, after which it is continued over itself to a point on the left side of the aforesaid tube about diametrically opposite the starting-point. As shown, the next one of the strips F is placed so as to overlap about one-half the width of the one preceding, started approximately in line with the finishing-point of the first and wrapped in precisely the same manner, but in the opposite direction, until it finishes at about where its predecessor started. This method of wrapping the strips F is continued throughout the length of the caoutchouc tube, and said strips having been treated with a coating of caoutchouc they adhere to said tube and to the peripheral bracing-strips D E, as well as to each other and to themselves. By wrapping the strips F alternately in opposite directions, as best shown in Figs. 4, 5, and 6, I obtain the best results in the matter of compensation for strain; but it is possible to otherwise wrap said strips and obtain the varying number of layers, as herein specified, at different points on the tube without departure from the spirit of my invention. The ends of the tube C are now cut off true on the overlapping ends of the mandrel A in proportion to the diameter of the circle said tube is to form. The tube is now withdrawn from the mandrel and its ends butt-joined, after which it is placed in a two-part mold H, a layer I of caoutchouc having been previously placed upon the fibrous portion of said tube to surround the sleeve B, above described; this layer of caoutchouc being clearly illustrated in Fig. 10.

From the peculiar form of the mandrel A, as above described, the tube C has an arch shape in cross-section, and the interior of the mold H is correspondingly formed. Before or after placing the tube in the mold I inject it with water or other suitable material that is expansible under heat, this material being introduced into said tube through a nozzle J, detachably connected to the sleeve B, that is integral with said tube, this nozzle being shown in Fig. 8. The mold, with its contents, is now subjected to a suitable degree of heat, and the expansion of the water or other material in the tube causes the latter to fill out in all directions, as far as the limits of said mold will permit, after which said mold and contents are kept hot for a sufficient time to cause a vulcanizing together of the caoutchouc and fibrous material of which said tube is composed. The vulcanizing process having been completed, the tube is taken from the mold and is ready for attachment to the rim of a wheel of the proper diameter, said finished tube being non-expansible under inflation with air, gas, or other fluid under pressure, and very difficult to puncture under any of the conditions to which a pneumatic tire is ordinarily subjected. The finished tube may of itself be sufficient as a tire; but I prefer to envelop it with a protective covering K, that is built from caoutchouc on a mandrel L, the latter having the same general contour in cross-section as said tube, with the exception that a rib M of suitable width extends from the approximately straight side of said mandrel, and thus, instead of the protective covering being a tube, it is in the form of an arc having the extremities thereof turned in toward each other, as clearly illustrated in Figs. 6 and 12. The protective covering K is built up so as to have the greatest thickness on its tread, this thickness being gradually diminished in opposite directions. The mandrel L and its caoutchouc covering are placed in a two-part mold N and subjected to a vulcanizing heat, after which the vulcanized protective covering is cemented to the tube previously described, and then the tire thus formed is cemented or otherwise secured to the rim of a wheel, this rim G being of a width and countour corresponding to that of the opposing portion of the tire. Upon inflation the tire has a tendency to change its shape in cross-section from an arch to an oval, and in consequence of this tendency said tire hugs tight upon the wheel-rim and is not readily dislodged therefrom under any circumstances.

While the tire above described is not liable to puncture under ordinary circumstances, still a puncture is always possible, and in such an instance the punctured base or non-fibrous portion of said tire may be easily reached and repaired. Assuming that a puncture has been made, it is only necessary to loosen and throw off a portion or all of the outer protective covering K, make such cuts in the fibrous layers as will enable the operator to strip off portions of the same, as shown in Fig. 7, to expose the non-fibrous portion of the tire, after which a patch is put over the puncture and the cut portions of said fibrous layers replaced and cemented together. When the tread portion of the tire is punctured, the fibrous bracing-strip E is not to be parted when the outer fibrous layers are cut through; but in order to get at the puncture in the non-fibrous portion of said tire a section P of said bracing-strip is cut out and turned back, as also shown in Fig. 7.

In the foregoing I have set forth that a previously-formed tube of caoutchouc is shaped upon a ring-like mandrel, and in order that this step in the method of manufacturing my tire may be better understood, especially as to the meaning of the term "shaped," attention is called to the fact that said tube in the first instance is formed upon a straight mandrel. The straight tube is then drawn onto the ring-like mandrel to thereby form a circle, and suitable tools are employed to smooth out such irregularities of surface as occur in effecting the change of said tube from a straight line to a circle, these irregularities being due to the variation of length between the inner and outer circumference of said ring-like mandrel.

This specification contains features set forth in another application, Serial No. 423,821, filed by me on March 5, 1892, the matter common to both being a single-tube pneumatic tire, comprising a previously-formed tube of caoutchouc shaped on a ring-like mandrel, preferably braced by circumferential strips of fibrous material and enveloped with a reinforce of similar material, the braced and reinforced tube being joined at its ends after withdrawal from the mandrel and vulcanized. The herein-described mandrel is also shown and described in my application, Serial No. 425,570, filed March 19, 1892, and in this latter application said mandrel is covered with a fibrous material, to which the caoutchouc is subsequently applied, the ultimate product being a single-tube pneumatic tire.

Having thus described my invention, what I claim as new, and desire to secure by Letters Patent, is—

1. A pneumatic tire comprising an endless tube of caoutchouc vulcanized in one piece with fibrous material so disposed as to present a variable number of layers in cross-section, the greatest number of these layers being on the tread portion of said tube, substantially as set forth.

2. A pneumatic tire comprising an endless tube of caoutchouc vulcanized in one piece with fibrous material so disposed as to present a variable number of layers in cross-section, the greatest number of these layers being on the tread portion of said tube, and an outer protective covering for the tube, substantially as set forth.

3. A pneumatic tire comprising an endless tube of caoutchouc, having a circumferential bracing of fibrous material and a wrapping of like material so disposed as to present a variable number of layers in cross-section, the greatest number of these layers being on the tread portion of the tube, substantially as set forth.

4. A pneumatic tire comprising an endless tube of caoutchouc, having a circumferential bracing of fibrous material and a wrapping of like material, the latter being so disposed sa to present a variable number of layers in cross-section, the greatest number of these layers being on the tread portion of the tube, and an outer protective covering for the tube, substantially as set forth.

5. A pneumatic tire comprising an endless tubular base of caoutchouc, wound with a series of fibrous reinforcing-strips so disposed as to present a variable number of layers in cross-section, the greatest number of these layers being on the tread portion of said tubular base, substantially as set forth.

6. A pneumatic tire comprising an endless tubular base of caoutchouc, wound with a series of fibrous reinforcing-strips so disposed as to present a variable number of layers in cross-section, the greatest number of these layers being on the tread portion of said tubular base, and an outer protective covering on the fibrous material, substantially as set forth.

7. A pneumatic tire comprising an endless tubular base of caoutchouc, having one or more circumferential bracing-strips of fibrous material and a series of fibrous reinforcing-strips wound on the base and bracing-strips at right angles to the latter in such a manner as to present a variable number of layers in cross-section, the greatest number of these layers being on the tread portion of said base, substantially as set forth.

8. A pneumatic tire comprising an endless tubular base of caoutchouc, having one or more circumferential bracing-strips of fibrous material and a series of fibrous reinforcing-strips wound on the base and bracing-strips at right angles to the latter in such a manner as to present a variable number of layers in cross-section, the greatest number of these layers being on the tread portion of said base, and an outer protective covering on the fibrous material, substantially as set forth.

9. A method of manufacturing pneumatic-tire tubes, that consists in shaping a previously-formed tube of caoutchouc upon a ring-like mandrel, enveloping this tube with a reinforce of fibrous material previously stretched and treated with caoutchouc, withdrawing the tube from the mandrel and joining its ends, injecting the tube with a material expansible under heat, and then vulcanizing in a suitable mold, substantially as set forth.

10. A method of manufacturing pneumatic-tire tubes, that consists in shaping a previously-formed tube of caoutchouc upon a ring-like mandrel, wrapping the tube with previously-stretched and caoutchouc-coated strips of fibrous material so disposed as to present a variable number of layers at different points, withdrawing the tube from the mandrel and joining its ends, injecting the tube with a material expansible under heat, and then vulcanizing in a suitable mold, substantially as set forth.

11. A method of manufacturing pneumatic-tire tubes, that consists in shaping a previously-formed tube of caoutchouc upon a ring-like mandrel, bracing the tube with one or more strips of fibrous material previously stretched and treated with caoutchouc, wrapping the tube and bracing-strips with other fibrous strips, also previously stretched and treated with caoutchouc, whereby a variable number of layers are had at different points, withdrawing the tube from the mandrel and joining its ends, injecting the tube with a material expansible under heat, and then vulcanizing in a suitable mold, substantially as set forth.

12. A method of manufacturing pneumatic-tire tubes, that consists in shaping a previously-formed tube of caoutchouc upon a ring-like mandrel, enveloping the tube in a reinforce of fibrous material previously stretched and treated with caoutchouc, withdrawing the tube from the mandrel, and joining its ends, injecting the tube with a material expansible under heat, then vulcanizing in a suitable mold, and afterward securing a protective covering on the vulcanized product, substantially as set forth.

In testimony that I claim the foregoing I have hereunto set my hand, at Milwaukee, in the county of Milwaukee and State of Wisconsin, in the presence of two witnesses.

FRANK. H. BOLTE.

Witnesses:
N. E. OLIPHANT,
JOHN E. WILES.